Oct. 6, 1970 J. LAPLUME 3,532,859

IDENTIFYING SYSTEM USING OPTICAL CODES

Filed Sept. 26, 1967 3 Sheets-Sheet 1

JACQUES LAPLUME,
Inventor
by Stephen H. Frishauf
Atty

United States Patent Office 3,532,859
Patented Oct. 6, 1970

3,532,859

IDENTIFYING SYSTEM USING OPTICAL CODES

Jacques Laplume, Gif-sur-Yvette, France, assignor to Societe d'Etudes Techniques et d'Entreprises Generales "Sodeteg," a corporation of France Filed Sept. 26, 1967, Ser. No. 670,686
Claims priority, application France, Oct. 18, 1966, 80,379
Int. Cl. G06k *9/18*
U.S. Cl. 235—61.11 16 Claims

ABSTRACT OF THE DISCLOSURE

Moving objects e.g. railway cars (C) to be identified and sorted are equipped with optical code cards (10) comprising reflective and non-reflective squares arranged in characteristic binary code patterns. As a car moves past an identifying station a flashing projector (18) is triggered to flash a beam of light on the code card and the reflected beam is picked up by an array (20) of photo-cells disposed in a similar rectangular configuration to that of the elementary squares of the code cards. The photo-cell output signals are electronically processed to produce a binary signal corresponding to the characteristic binary code pattern picked up.

BACKGROUND OF THE INVENTION

This invention relates to code identifying systems of a type that is especially useful in the automatic identification of objects in motion past an identifying station, e.g. in railway car sorting and similar operations. The invention is more particularly directed to systems of that kind which operate on an opto-electrical basis, that is wherein optical codes are read or scanned by means of a beam of light or other optical radiation and thereafter converted to electric signals.

Opto-electrical code identifying systems have been proposed before, but have suffered from limitations that have made them unsuitable for many purposes. Thus, such systems have often been unreliable and liable to produce erroneous identifying signals under the influence of uncontrollable variations in general illumination, spurious reflections, and other causes. To prevent this difficulty it has generally been necessary to use intense beams of light consuming considerable power.

Another important source of difficulty was that inherent to the motion of the objects to be identified. Such motion tends to blur the code patterns and has been a further source of unreliability. It has often been considered necessary to use code patterns of a kind not susceptible to blurring by relative motion, such as binary codes in the form of stripes parallel to the direction of motion. This has imposed limitations on the number of code combinations effectively usable in a given situation.

SUMMARY OF THE INVENTION

Objects of this invention have been the provision of an improved opto-electrical code identifying system having all or part of the following advantages: High reliability and insensitivity to variations in lighting and other spurious light signals, together with very low average power consumption; employment of simple, compact and effective code patterns capable of representing extremely numerous different combinations; and insensitivity to relative motion between the code patterns and the identifying station.

SUBJECT MATTER OF THE INVENTION

Optical code carriers are provided which are preferably of rectangular shape comprising elementary areas, e.g.

squares, having two different types of radiation-transfer characteristics, such as reflective and non-reflective, which elementary areas are arranged in characteristic binary code patterns. As each code carrier moves past an identifying station, a flashing projector is triggered to flash a short bright beam of light (or other optical radiation) at the code carrier. The identifying station further includes a pickup device in the form of an array of photocells disposed in a configuration (e.g. rectangular) similar to the configuration of elementary areas or squares in the code carriers, so that each photocell is illuminated with the light transferred substantially only from the particular elementary area with which it corresponds. Thus, in case said elementary areas or squares are respectively reflective and non-reflective, only those photocells that are illuminated with light from reflective areas of the code carrier, are energized. The photocell outputs are combined into an output signal which is a binary representation of the particular code pattern that was illuminated with the flashing beam.

Such a system will be seen to have many advantages. The use of a short flash (e.g. 1 millisecond in duration) to illuminate the code carriers makes it possible to use a very strong beam while maintaining the overall power requirements of the system low. At the same time, the system becomes substantially insensitive to relative motion of the codes, since the flash is so short that blurring by motion is negligible. An additional advantage of the short flash resides in the feasibility of using two-dimensional code patterns capable of representing great numbers of different combinations compactly and unambiguously. Further features and advantages of the invention will appear.

Exemplary embodiments of the invention will now be described with reference to the accompanying drawings, wherein.

DESCRIPTION OF THE PREFERRED EMBODIMENTS

Figure 1:
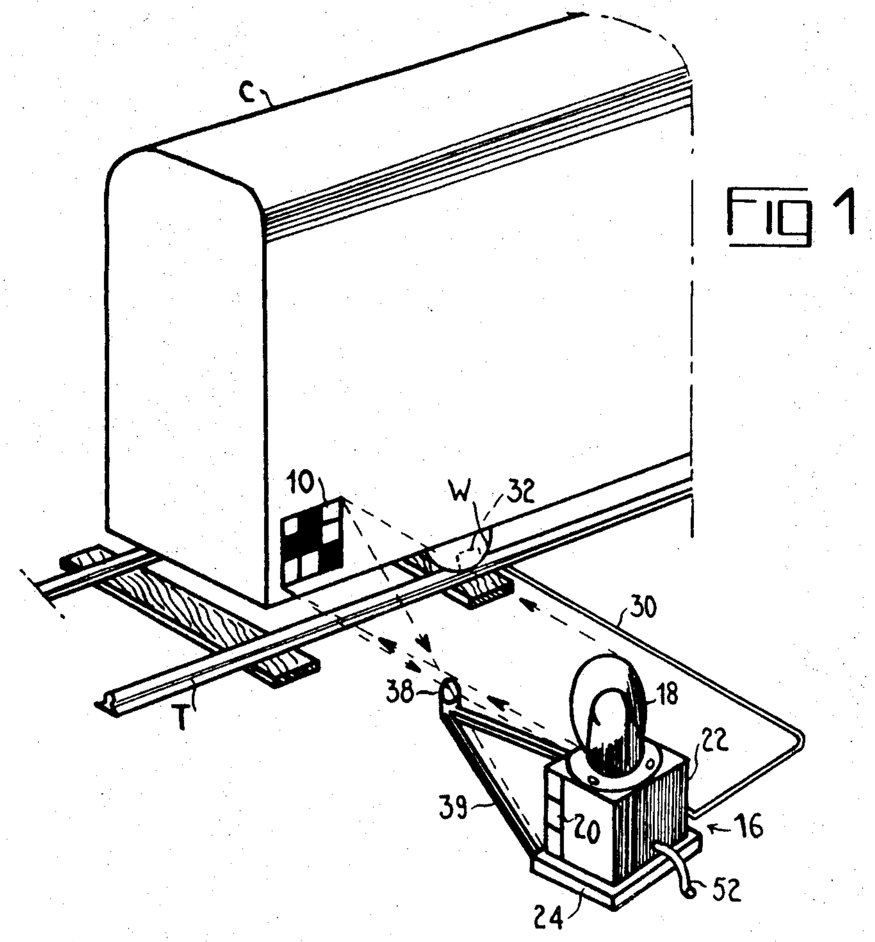
FIG. 1 is a pictorial view of an embodiment of the invention associated with a railway car.
Figure 2:
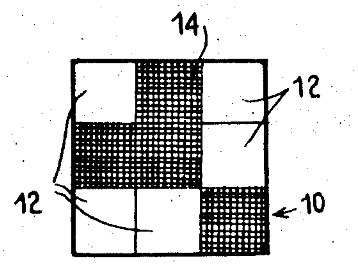
FIG. 2 is a front view of a reflective code pattern.

In FIG. 1 the system of the invention is shown in its application to railway sorting work, as used e.g. for the shunting of freight cars of various destinations in a marshalling yard or the like. The figure shows part of a freight car C moving along a railway track T. Carried on a side wall of car C is an identifying plate or card 10 which forms part of the system of the invention. In the exemplary embodiment, identifying card 10 is a rectangular plate subdivided into a number of small rectangular areas of squares all of equal size, and in the specific example illustrated card 10 is square and includes three by three i.e. nine elementary sqares. As more clearly shown in FIG. 2, the squares of which card 10 is formed are of two kinds which differ in their light-reflecting properties. Specifically, certain of the squares, designated 12, are provided with a non-reflective (i.e. light-diffusing or absorbing) surface, while the remaining squares, designated 14, are made catadioptric or "reflective." A catadioptric- or reflexive surface is to be understood herein as a surface so formed that an incident light beam striking the surface has an appreciable part of its light energy reflected back in the same direction as the incident beam, regardless of the angle of incidence within reasonable limits. Catadioptric surfaces are well known, being widely used for road traffic control signals and the like, and can be provided in various well-known forms. Thus, such a surface can be produced by imbedding a multiplicity of small spherical beads of transparent material such as glass or clear plastic of suitable refractive index into a supporting surface, or alternatively by providing a multiplicity of small, convex, trirectangular trihedra made of similar transparent material.

The pattern according to which the non-reflective and reflective squares 12 and 14 are distributed in the identifying card 10 constitutes a binary identifying code, and it will be immediately understood that if plate 10 includes $m$ squares along one of its dimensions and $n$ squares along the other dimension, then the total number of code combinaitons available is $2^{mn}$. Thus in the illustrated example where $m=3$ and $n=3$, the number of available code combinations is $2^9=512$. This number increases very rapidly with the number of squares used, and in the case of an identifying card 10 having three squares along one side and four along the other, that number would be $2^{12}=4096$, which would probably be amply sufficient for any railway sorting and shunting requirements.

The system further includes an illuminating-and-sensing unit generally designated 16, mounted in a suitable position alongside the railway track T. The main components of unit 16 are, a flashing floodlight projector 18, a light-receiving array of photoelectric cells 20, and an electronic system 22. The lay-out of components in unit 16 may assume a great variety of forms, and it is to be understood that the particular lay-out here shown is exemplary only. As shown, then, unit 16 may include a stable base 24 of any suitable kind permanently or semi-permanently fixable in position, a block mounted on said base and including the photoelectric receiving array 20 in its front part directed towards the railway track T, and the electronics 22 in its rear part, and flash lamp 18 mounted on top of said block in a fixed or adjustable position. As just stated above this lay-out may be readily departed from; however, an important condition for the purposes of the invention presently described is that the flashing floodlight 18 and receiving array 20 should be positioned relatively close to each other.

The flashing projector 18 may be of any suitable and conventional type capable of producing a substantially parallel beam of intense light (white or monochromatic, or other suitable radiation) as a short flash, e.g. of the order of one millisecond duration, at a precisely controllable instant. While it would be within the scope of the invention to use a laser beam for this purpose, this would not usually be necessary and the drawing (FIG. 3) shows a more conventional type of projector 18 including a bulb 26 preferably of the vapor type and an associated parabolic reflector 28.

Means are provided for triggering pojector 18 to produce its flash at the instant the identifying code card or plate 10 carried by a car moving on track T, moves past the projector so as to be illuminated by the flash. The synchronized triggering means will later be described in detail, and are briefly summarized at this point as comprising e.g. an inductive pick-off device 32 associated with rail of track T to generate a voltage signal as a front wheel W of car C moves therepast, which signal is applied by way of a cable conductor 30 to the electronic section 22 of unit 16 in order to trigger the flash from lamp 18.

Figure 3:
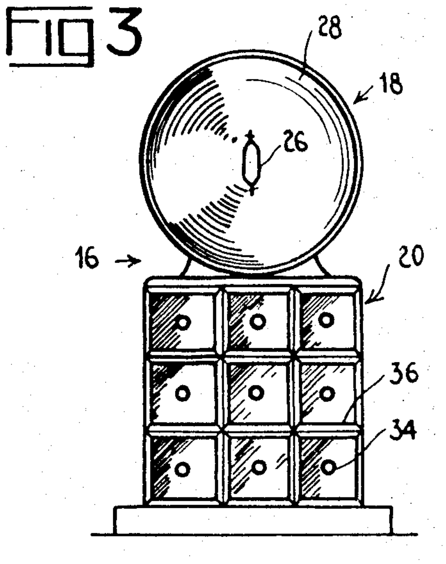
FIG. 3 is a front view of a projector and pickup assembly.

The receiving array 20 is constructed to have a general geometry similar to that of the identification code cards 10, that is, in the present example, see FIG. 3, it comprises a square array of three by three photoelectric cells 34, positioned at the centers of individual square recess defined and separated from one another by short opaque wall sections such as 36. The arrangement is such that the light reflected from any one of the individual squares of the code card 10, assuming such square is reflective (or "reflexive" in the sense earlier defined herein), will strike substantially a single corresponding one of the photocells 34 of array 20, in other words the light beam from source 18 will form an optical image of the code pattern 10 upon the photocell array 20. It will be understood that this optical image may be very imperfect and crude without impairing the effectiveness of the system of the invention, in view of the digital character of the process by which the information derived from that image is processed, as will presently be understood. If desired, an optical system here schematically represented as a lens 38 carried on an arm 39 may be interposed in fixed relation to the receiving array 20 in the path of the reflected light beam, in order to focus the reflected image of card 10 in inverted relation on receiving array 20 or, more precisely, to focus the reflected light from each reflective one of the squares 12 upon the respectively associated one of the photocells 34.

Figure 4:
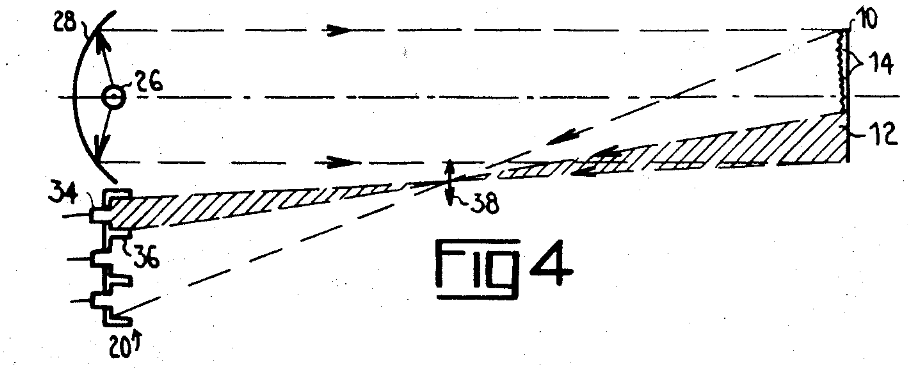
FIG. 4 is an optical diagram of the system of FIGS. 1 and 2.

FIG. 4 diagrammatically indicates the path of the light beam in the system just described. In this figure it is assumed that the code pattern 10, seen in cross section, includes two reflecting squares 14 in its upper part and a non-reflecting or diffusing square at the bottom. Accordingly, light is reflected only from the upper squares 14 on to the corresponding (lowermost) photocells 34 of array 20, as indicated by arrows, whereas no light is reflected from the diffusing square 12 towards the uppermost photocell 34, as indicated by the cross-hatched or darkened portion of the reflected beam.

Figure 5:
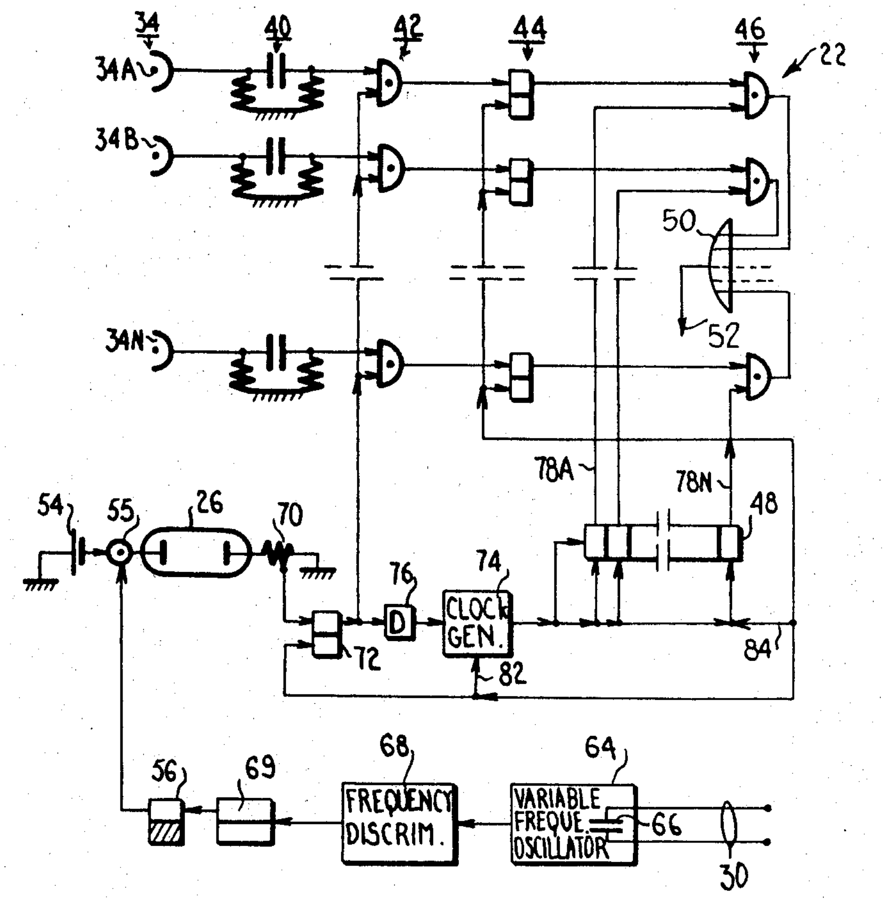
FIG. 5 is a logic and electronic diagram of the system.

Referring now to FIG. 5, an exemplary embodiment of the electrical part of the system of the invention will be described. Three of the photoelectric cells of array 20 are shown as elements designated 34A, 34B and 34N (N equals nine in the exemplary embodiment of FIGS. 1–3). The output line from each photocell 34 is applied by way of a high-pass network 40 including a series capacitor and two parallel resistors connected between the opposite sides of the capacitor and ground, to a first input of an AND-gate 42. The network 40 serves to suppress lower-frequency components of the photocell output signal, and has a time constant only very slightly longer than the predetermined duration of the flash produced by projector lamp 26. This ensures that any slowly-varying voltage signals from the photocells 34 as may be due to spurious variations in ambient illumination are suppressed, whereas the sharp voltage pulses produced by the reflected light from the reflective squares 14 of the code pattern 10 during the flash are transmitted practically without attenuation to the gates 42.

Each of the AND-gates 42 has a second input which is energized with a voltage signal at the time of the flash from lamp 26 in a manner to be later described.

The output from each gate 42 is applied to the setting input of a related bistable device or binary 44 (e.g. an Eccles-Jordan circuit). The output from each binary 44 is applied to a first input of a further AND-gate 46, each of which has its second input energized from a related stage of a stepping register 48 as later described. The outputs from all of the gates 46 are combined by way of an OR-gate 50 to feed a common output line 52.

The projector lamp 26 is schematically shown as being energized from a suitable source 54 by way of an electronic switch or power gate 55 which is actuated to pass current from source 54 to a terminal of lamp 26 on receiving a voltage at a switch control input connected to the output of a monostable device 56 having a time constant predetermined in accordance with the desired duration of the flash, e.g. 1 millisecond. The input of monostable device 56 is connected to the sensing device 32 earlier referred to by way of a trigger-control circuitry to be presently described.

Figure 6:
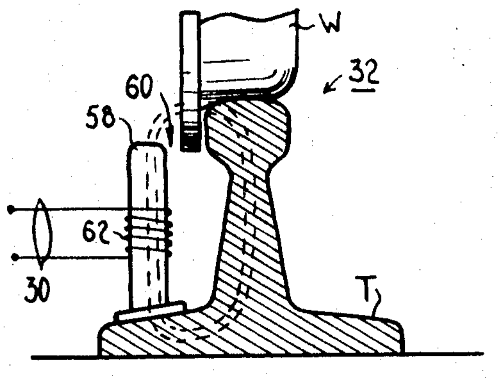
FIG. 6 is a part-sectional view of a position senser.

As shown in FIG. 6 the sensing device 32 in this example comprises a post or stub 58 of magnetic material upstanding from the base flange of track rail T. Post 58 is so dimensioned and positioned that when a wheel W of a car running on the track moves past said post, only a small airgap as indicated at 60 is present between the surface of post 58 and the flange of wheel W, whereas in the absence of a wheel at that position the airgap between post 58 and the upper flange of the rail is considerably wider as will be evident from the drawing. An inductance coil 62 is wound about post 58 and its ends are connected by way of the pair of conductors designated 30 and identifiable with the conductor cable similary designated in FIG. 1, with the frequency-varying input of a variable-frequency oscillator 64 (FIG. 5).

For example, and as schematically shown, the leads 30 may serve to connect winding 62 in parallel with an input capacitor 66 of oscillator 64, so that said capacitor and winding together form a resonant LC circuit the resonant frequency of which determines the output frequency of oscillator 64 in a well-known manner. More precisely, said output frequency is proportional to $1\sqrt{LC}$, where L and C are, respectively, the inductance of winding 62 and capacitance of capacitor 66. The output of variable oscillator 64 is connected to a frequency discriminator 68. The discriminator output is applied to the single input of a bistable circuit 69 of the type that is alternately switched between its two stable positions in response to successive pulses applied to its single input. One output of bistable device 69 is applied to the input of the earlier-mentioned monostable circuit 56.

In the operation of the flash-triggering circuitry just described, the arrival of a wheel W on the rail T at a position adjacent to magnetic core or post 58 causes a sharp reduction in the value of airgap 60 interposed in the magnetic circuit indicated by dotted flux lines in FIG. 6. This causes a sudden increase in the apparent inductance value L of winding 62 as seen at the input of variable oscillator 64 and a corresponding reduction in the output frequency of variable oscillator 64. This reduction is detected by frequency discriminator 68 which produces in response thereto an ouput voltage which voltage is applied to bistable circuit 69, switching this latter to its alternate stable condition. It will be understood that the need for circuit 69 arises because every car has, in the example here assumed, two pairs of wheels and it is required that the flash from lamp 26 be triggered only when one wheel pair, say the front wheel pair, is moving past position-senser 32. Device 69 constitutes in effect a two-counter, and ensures that monostable device 56 is switched momentarily to its unstable state only as the front wheel pair of a car moves past the senser. During the predetermined period, e.g. 1 millisecond, that device 56 remains in its unstable state it produces an output voltage which operates power gate or switch 55 to apply energizing current from source 54 to the electrode of lamp 56 which thus produces a flash of the prescribed duration. It will be apparent that should the cars C have more than two wheel pairs, e.g. bogey cars having three or four wheel pairs, then device 69 may be suitably replaced with a conventional three-counter or four-counter respectively.

The energizing circuit for flash lamp 26 is shown completed from its opposite electrode by way of a resistor 70 to ground. A tap from a point of resistor 70 is connected to the setting input of a bistable device or binary 72. The set output of binary 72 is connected to the second inputs of all of the AND-gates 42 previously referred to. Thus, on occurrence of a flash from lamp 26, part of the current flowing through the lamp as tapped from resistor 70 serves to set the binary 72, whereupon the gates 42 are opened to enable that output signals from those photocells 34 that have been illuminated from the code pattern to be passed to the related binaries 44. The gating arrangement just described ensures that only those photocell output signals are effectively utilized in the system which are produced simultaneously with the flash, and constitutes an efficient safeguard against spurious light signals.

It will be understood that with the system operating as so far described, the binaries 44 (A through N) are durably set, on occurrence of a flash from lamp 26, to respective states the overall combination of which constitutes a binary number uniquely associated with the particular code pattern of identifying card 10 which has just been illuminated by the flash. There are many applications in which this setting of binaries 44 may directly provide the output of the system, as by causing the set binaries to produce a visual display at a remote station, or other similar action. However, the exemplary embodiment here shown includes further means serving to "serialize" the data provided in parallel form by the simultaneous states of binaries 44, and make that data available as a serial binary signal train on output line 52.

The serializing means just referred to includes the earlier-mentioned shift register 48 the operation of which will now be described. Register 48 may be a conventional stepping register comprising N binary stages, N being the number of elementary areas in the code pattern 10 and the number of photocells 34 and associated signal channels. The binary register stages have stepping inputs connected to receive isochronic shift pulses in parallel from the output of a clock generator 74. The outputs 78A to 78N from the respective register stages are connected to the second inputs of earlier-mentioned AND-gates 46. Clock generator 74 has a starting input connected to receive the output from binary 72 when in its set state, by way of a time delay circuit 76. The last stage output 78N of register 48 serves a plurality of resetting functions. As shown, said last stage output 78N is connected to the reset inputs of all binaries 44, the reset input of binary 72, a stopping control input 82 of clock generator 74, and a resetting line 84 for resetting all the binary stages of register 48.

In operation, the setting of binary 72 on occurrence of a flash from lamp 26 starts clock generator 74 after a short time delay (in device 76) which ensures that the channel binaries 44 have been effectively triggered to their final states by the photocell output signals. The clock pulses from generator 74 are applied to the initial stage of register 48 and to the shift inputs of all the register stages, so that the stage output lines 78A through 78N emit a series of N pulses in sequence. These sequential pulses act to open the gates 46A through 46N in sequence. There is thus passed through OR-gate 50 to output line 52 a serial binary signal train having N digital positions, each position representing a 0 or a 1 bit depending on whether the respectively corresponding photocell 34A through 34N was or was not illuminated. Thus the serial output signal is a binary representation of the identified code pattern.

Figure 7:
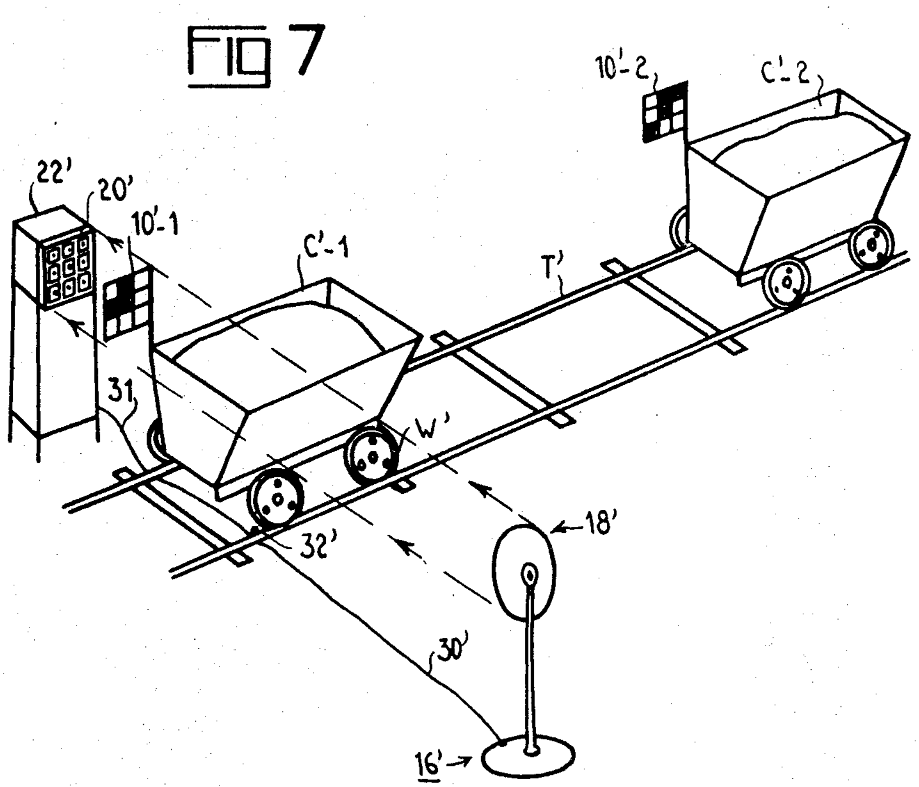
FIG. 7 is a pictorial view generally similar to FIG. 1 but depicting another embodiment of the invention, using code patterns including transparent rather than reflective areas.

FIG. 7 illustrates a modified system according to the invention in which the beam of light or other radiation is made to traverse the identification patterns rather than being reflected from them. The system is here shown applied by way of example to a narrow-gauge track, T' over which trucks such as C'1, C'2 . . . are run. The trucks may, for instance, carry loads of different grades of ore or other product for different destinations. Each truck is shown provided with an upstanding arm carrying an identification plate or card designated 10'–1, 10'–2, . . . respectively. Each card 10', as in the first embodiment described, is a rectangle including a number of elementary areas, e.g. squares, having different light-transferring characteristics, the plate being again shown as composed of three by three squares. In this embodiment, however, the elementary squares instead of being reflective and non-reflective as in the first embodiment, are respectively transparent and opaque to the light or other radiations used. Each card 10′ may for example comprise a sheet of strong transparent palstic such as "Plexiglass" having certain elementary squares therein coated with black paint to provide the identifying code patterns. Cards 10′–1 and 10′–2 are shown as bearing different code patterns, to identify the nature of the loads in the respective trucks. The identifying station in this case comprises the flash lamp 18′ positioned on one side of the track, and the photocell array 20′ and associated electronics 22′ positioned on the opposite side of the track. Each of these components may be similar or identical with the similarly-designated components described for the first embodiment. The photocell array 20′ is arranged with a geometry similar to that of the elementary areas of the identifying cards 10′, so that each photocell will be illuminated substantially with rays passed through a single, corresponding one of the elementary areas of a card 10′. A sensing device 32′, which may be similar to sensing device 32 earlier described, or may comprise an electromechanical switch, produces a triggering signal when a truck C′ reaches a predetermined position in which its card 10′ is accurately in line between projector 18′ and receiving array 20′, and this signal is applied through a conductor 30′ forming part of a cable to trigger the flash of projector lamp 18′ as earlier described. Simultaneously with the flash, a voltage signal is applied by way of a conductor 31 forming part of a cable to the electronics 22′ for performing the functions earlier described, primarily the setting of binary 72. The operation of the system will be readily understood in the light of earlier explanations without requiring further description. The binary output signals appearing at the output of electronics 22′, may be used for instance to actuate automatic switch control equipment for switching the trucks C′1, C′2 . . . to various sidings or destinations according to their respective contents, and/or to operate counter means, in order to provide separate counts of the different kinds of carloads.

Numerous modifications may be introduced into the forms of embodiment of the invention disclosed, and each of the basic components of it may be refined in many ways, without exceeding the scope of the invention.

Thus, the identifying card patterns used may be other than rectangular, and the elementary areas therein may have any suitable shape. In the embodiment using reflective code patterns disclosed with reference to FIGS. 1–4, the provision of the reflective elementary areas in the form of "reflexive" or catadioptric surfaces is particularly advantageous in that it affords a desirable range of tolerance on the precise relative position of the identifying pattern and the projector-receiver assembly at the instant the flash is triggered off. However, in many cases it may be satisfactory to use smooth reflective surfaces for the same purpose. In one convenient embodiment of the code carriers, all the carriers may be provided in the form of identical rectangular plates having a solid catadioptric surface, and a set of masks or grids may be arranged for selective attachment in overlying relation with said surfaces, the grids being cut out in accordance with the individual code patterns to be displayed. If desired, the contrast between the elementary areas of different characteristics may be increased, and the influence of suprious illumination reduced, by rendering the non-reflective areas light-absorbent, e.g. with a suitable black coating, and providing a similar light-absorbing border around the code pattern.

Various conventional optical means may be interposed in the path of the beam ahead of and/or beyond the identifying card for various purposes. For example, a variable iris diaphragm may be interposed, e.g. immediately to the right of lens 38 in FIG. 4, and associated with an automatic control device for reducing the diaphragm aperture in case of an increase in daylight illumination and vice versa, in order to avoid overloading the photocells 34. Further, the irradiating beam may comprise radiation of any desired spectral characteristics, through the use of a suitable source such as a vapor lamp using vapor of selected chemical composition, and/or associating a filter of selected characteristics with said source. This may be advantageous in order to enable the system to distinguish more effectively between the useful flash signal and the ambient (e.g. daylight) illumination and thus render the system less sensitive to spurious signals caused by variations in ambient lighting.

The position-sensing means and associated flash-triggering circuitry may likewise be modified in many ways. Thus, in place of the inductive position-sensing device shown as 32, a capacitive sensing device, or a mechanical one, such as a stop mechanically engageable with a switch actuating arm, may be used. Instead of the variable-frequency oscillator device 64 shown in FIG. 5, a balanced impedance-bridge circuit may be used, with inductance 62 (or equivalent position-responsive element, such as a capacitance) constituting one arm of the bridge, the bridge being so adjusted that it is normally balanced and will be unbalanced by the arrival of the moving object, say wheel W, into the prescribed position to generate a voltage signal that is applied to monostable device 56 or is otherwise used to trigger the flash.

Where a particularly high accuracy for the instant at which the flash is triggered is desired, the simple position-sensing device disclosed may be replaced with a dual type device operating on a comparison basis. For example, two magnetic cores similar to post 58 may be provided spaced a short distance apart (e.g. 10 cm.) along the rail T, and each provided with an inductive winding such as 62, each winding being connected with its individual variable oscillator and associated frequency discriminator circuit, the discriminator outputs being applied to respective inputs of a voltage comparator having its output applied through binary 69 to monostable device 56 or other flash triggering device. The adjustments may be so made that the comparator output will deliver a voltage pulse at the instant wheel W (or other moving object) assumes a precisely determined position intermediate the two posts 58.

Also, more complex combinations of position-sensing devices may be provided in order to prevent spurious triggering of the flash more than once per car. Thus in the case of bogey-cars having two wheel pairs per bogey, there may be provided four position-sensing devices suitably spaced and adjusted and associated circuitry such that the flash will only be triggered when the following set of conditions is simultaneously fulfilled; the outer pair of sensers produce equal signals, the inner pair of sensers produce equal signals, and at least one of said signals is not zero. In these conditions, the flash will be triggered whenever a single wheel moves past the midpoint of the inner pair of sensers, or whenever both wheels of a common bogey move past the sensers of the outer pair.

The logic section of the electronics 22 can of course also be varied considerably. As indicated, the serializing means may be omitted and the output signal derived in parallel form, as from the set of binaries 44. Where serialization is used, the stepping register 48 may be replaced with some other suitable form of shift pulse generator producing time displaced pulses on a set of N outputs, such as a lumped-constant delay line having the N output lines tapped from spaced points thereof.

While the invention is here disclosed in a system in which the objects to be identified are movable with respect to a fixed identifying station, it will be apparent that the invention is equally applicable in the reciprocal set-up involving a mobile identifying station movable past an array of stationary (or moving) objects that are to be identified. As a further modification that would lie within the scope of the invention, instead of a single flashing source of rays provided at the identifying station, there may be provided a plurality of said sources associated with the code carriers or cards, e.g. for movement with the movable objects.

In the claims, the word "optical" is to be understood as referring to any suitable form of radiation, visible or invisible having straight-line propagation characteristics similar to that of light.

What I claim is:

1. An identifying system comprising:
an identifying station (16, 16′);
a plurality of optical code carriers (10, 10′) relatively movable past said station;
said code carriers all comprising arrays of elementary areas (12, 14) disposed in a common over-all geometrical configuration;
each elementary area having one of two different radiation-transferring characteristics, and the elementary areas of both characteristics being distributed in each of the code carrier arrays in accordance with a characteristic code pattern identifying the particular carrier;
flashing source means (18, 18′) operable to generate a flash of optical radiation short with respect to the time of movement of said carrier past said flashing source means as each code carrier reaches a prescribed relative position with respect to the identifying station, said flashing source means being located to illuminate, upon a single flash, the entire code carrier array;
radiation pickup means (20, 20′) at said station comprising:
an array of transducer elements (34) disposed in a similar overall geometric configuration to that of said elementary areas (12, 14) in all said code carrier arrays (10, 10′) and said array of elements being arranged to be irradiated during said flash with radiation transferred thereto from all said respectively related ones of the elementary areas (12, 14) of the illuminated code carrier; and
electric means (22, 22′) connected with all said transducer elements (34) producing an output signal corresponding to the distribution of the particular transducer elements (34) that have been effectively irradiated during said one flash and hence corresponding to the identifying code pattern of the illuminated code carrier.

2. The system defined in claim 1, wherein the elementary areas (12, 14) having different radiation-transferring characteristics are respectively reflective and non-reflective and said pick-up means (20) is disposed generally on the same side from the code carrier (10) as is said flashing means (18), at the instant of the flash.

3. The system defined in claim 2, wherein said reflective areas (14) have catadioptric or reflexive characteristics.

4. The system defined in claim 1, wherein the elementary areas (12, 14) of different radiation-transferring characteristics are respectively transparent and opaque and said pick-up means (20′) is disposed generally on the opposite side from the code carrier (10′) from said flashing means (18′), at the instant of the flash.

5. The system defined in claim 1, wherein said code carrier arrays (10, 10′) are of generally flat rectangular configuration subdivided into rectangular elementary areas with said different characteristics and said transducer elements in the pick-up means (20, 20′) are disposed in a similar rectangular array.

6. The system defined in claim 1, wherein said flashing source means (18, 18′) comprises a flasher lamp (26) and reflector means (28) associated therewith for producing a directional beam of radiation directed at the entire surface of said code carrier (10, 10′).

7. The system defined in claim 1, including position-sensing means (32, 32′) responsive to a predetermined relative position between one of said code carriers (10, 10′) and said identifying station (16, 16′), for generating a command signal triggering said flashing source (18, 18′) to generate said flash of radiation.

8. The system defined in claim 7, wherein said electric means includes normally closed gating means (42) connected in the outputs from the respective trtansducer elements (34) and means (72) connected for actuating the gating means to a signal-passing condition in synchronism with said flash.

9. An identifying system cimprising:
an identifying station (16, 16′);
a plurality of optical code carriers (10, 10′) relatively movable past said station;
said code carriers all comprising arrays of elementary areas (12, 14) disposed in a common over-all geometrical configuration;
each elementary area having one of two different radiation-transferring characteristics, and the elementary areas of both characteristics being distributed in each of the carrier arrays in accordance with a characteristic code pattern identifying the particular carrier;
a flashing source (18, 18′) at said station and providing a beam of light illuminating the entirety of said any one of said code carriers;
position-sensing means (32, 32′) responsive to the arrival of a code carrier (10, 10′) at a prescribed relative position with respect to the station (16, 16′) and connected to the flashing source for triggering the latter to generate a brief flash of optical radiation directed at the entirety of said code carrier the duration of said flash being short with respect to the time of movement of a carrier past said beam;
radiation pickup means (20, 20′) at the station comprising; an array of transducer elements (34) disposed in a similar overall geometrical configuration to that of said elementary areas in all the code carrier arrays, said elements being arranged to be simultaneously irradiated during said flash with radiation transferred thereto from a respectively related one of the elementary areas of the illuminated code carrier;
gating means (42) connected to outputs of said transducer elements and having means (70–72) connected for actuating said gating means to a signal-passing condition substantially only during said flash; and
digital signal means (44–70) connected to the outputs of said gating means (42) for deriving an output signal corresponding to the code pattern characterizing an illuminated code carrier.

10. The system defined in claim 9, including electrical filtering networks (40) connected to the outputs of the respective transducer elements (34) and having a time constant so predetermined in respect to the duration of said flash as to arrest transducer output signals caused by relatively slow variations in illumination.

11. The system defined in claim 9, wherein the digital signal means includes a set of bistable devices (44) connected to the outputs of said gating means (42) and settable in accordance with the transducer output signals passed thereby.

12. The system defined in claim 9, wherein the digital signal means includes serializing circuitry (46–50) connected for deriving from the transducer output signals a serial output signal in the form of a train of binary digits.

13. The system defined in claim 11, wherein the digital signal means further includes a set of coincidence gates (46) having first inputs connected to the outputs of the respective bistable devices (44), means (48) operable to generate a series of time-displaced pulses, means (78A . . . 78N) connected for applying said time-displaced pulses serially to second inputs of the respective concidence gates (46), and combining means (50) connected to the outputs of said coincidence gates for producing a serial output signal in the form of a binary digit train corresponding to said code pattern characterizing an illuminated code carrier.

14. The system defined in claim 1, including optical focalizing means (38) interposed in the path of the beam.

15. The system defined in claim 1, wherein the beam of optical radiation has spectral characteristics substantially different from the normal prevailing light illuminating the system.

16. The system defined in claim 1, wherein each code carrier (10, 10′) comprises a continuous rectangular base surface having catadioptric reflecting properties, and a plurality of separate code grids selectively affixable in overlying relation with said base surfaces and composed of respectively transparent, and opaque non-reflective, elementary areas (12, 14) to provide said characteristic code patterns when the grids are affixed over the base surface.

References Cited

UNITED STATES PATENTS

| | | | |
|---|---|---|---|
| 3,253,126 | 5/1966 | Baughman | 340—146.3 |
| 3,277,283 | 10/1966 | Rabinow et al. | 340—146.3 |
| 3,289,172 | 11/1966 | Towle | 235—61.11 |
| 3,327,098 | 6/1967 | Riggin | 340—146.3 |
| 3,417,231 | 12/1968 | Stites et al. | 235—61.11 |

THOMAS A. ROBINSON, Primary Examiner

U.S. Cl. X.R.

250—219; 340—146.3